(12) United States Patent
Smith

(10) Patent No.: US 7,287,947 B2
(45) Date of Patent: Oct. 30, 2007

(54) FRONT LOADING TRAILER AND METHOD OF USE

(76) Inventor: Francis V Smith, P.O. Box 3487, Bozeman, MT (US) 59772

( * ) Notice: Subject to any disclaimer, the term of this patent is extended or adjusted under 35 U.S.C. 154(b) by 149 days.

(21) Appl. No.: 10/688,917

(22) Filed: Oct. 21, 2003

(65) Prior Publication Data

US 2004/0150188 A1   Aug. 5, 2004

Related U.S. Application Data

(60) Provisional application No. 60/444,867, filed on Feb. 5, 2003, provisional application No. 60/458,042, filed on Mar. 28, 2003, provisional application No. 60/461,795, filed on Apr. 11, 2003, provisional application No. 60/467,132, filed on May 2, 2003.

(51) Int. Cl.
*B62D 53/06* (2006.01)

(52) U.S. Cl. .................................... 414/481; 280/441.2

(58) Field of Classification Search ................ 414/481; 280/491.5, 789–790, 797, 2, 418, 415.1; 296/25
See application file for complete search history.

(56) References Cited

U.S. PATENT DOCUMENTS

| | | | | |
|---|---|---|---|---|
| 2,491,044 A | * | 12/1949 | Holland | 280/656 |
| 2,665,142 A | * | 1/1954 | Talbert | 280/680 |
| 2,760,784 A | * | 8/1956 | Talbert et al. | 280/680 |
| 2,846,263 A | * | 8/1958 | La Rue | 296/184.1 |
| 2,871,027 A | * | 1/1959 | Brockman | 280/425.2 |
| 2,878,033 A | * | 3/1959 | Polich | 280/441.2 |
| 2,978,128 A | * | 4/1961 | Polich, Jr. | 414/481 |
| 3,066,954 A | * | 12/1962 | Brockman | 280/441.2 |
| 3,066,955 A | * | 12/1962 | Brockman | 280/441.2 |
| 3,101,819 A | * | 8/1963 | Shinn | 52/731.6 |
| 3,317,219 A | | 5/1967 | Hindin et al. | |
| 3,498,636 A | * | 3/1970 | Dorwin et al. | 327/304 |
| 3,505,767 A | | 4/1970 | Fyle, Jr. | |
| 3,536,340 A | * | 10/1970 | Talbert | 280/441.2 |
| 3,866,947 A | | 2/1975 | Yakubow | |
| 3,986,726 A | * | 10/1976 | Vos | 280/441.2 |
| 4,101,158 A | * | 7/1978 | Jones | 296/10 |
| 4,119,224 A | * | 10/1978 | Moody | 414/537 |
| 4,199,298 A | | 4/1980 | Webre, Jr. et al. | |
| 4,219,211 A | * | 8/1980 | Sauers | 280/441.2 |
| 4,231,709 A | | 11/1980 | Corsetti | |

(Continued)

FOREIGN PATENT DOCUMENTS

AU     PR7397     9/2001

(Continued)

*Primary Examiner*—Patrick Mackey
*Assistant Examiner*—Charles Greenhut
(74) *Attorney, Agent, or Firm*—Clark & Brody

(57) ABSTRACT

A trailer for hauling heavy equipment includes front end loading assembly that allows hitching and loading, a trailer bed, and a set of rear wheels. Longitudinally aligned support beams from the trailer bed, ends terminating at the front end loading assembly. The front end loading assembly comprises a low profile trailer front end section that uses a box beam positioned between the support beams and a pickup shaft of the assembly. The low profile front end section reduces the height of the front end of the trailer, thereby allowing loading of small equipment, while maintaining its load carrying and transmitting capability for heavy equipment. The trailer can be modular in design with removable ramp and trailer bed side sections.

26 Claims, 10 Drawing Sheets

U.S. PATENT DOCUMENTS

| | | | |
|---|---|---|---|
| 4,262,923 A | | 4/1981 | Weir |
| 4,290,642 A | | 9/1981 | Wise |
| 4,358,133 A | * | 11/1982 | Stucky ........................ 280/656 |
| 4,413,836 A | * | 11/1983 | Losh ........................ 280/441.2 |
| 4,452,555 A | | 6/1984 | Calabro |
| 4,570,967 A | * | 2/1986 | Allnutt ........................ 280/656 |
| 4,819,955 A | | 4/1989 | Cobb |
| 5,112,082 A | * | 5/1992 | Clelland ..................... 280/783 |
| 5,242,185 A | * | 9/1993 | Carr et al. ............... 280/423.1 |
| 5,246,241 A | * | 9/1993 | Baver ..................... 280/407.1 |
| 5,415,425 A | * | 5/1995 | Zerbe et al. ............. 280/441.2 |
| 5,419,577 A | * | 5/1995 | Murray ....................... 280/656 |
| 5,435,586 A | | 7/1995 | Smith |
| 5,611,570 A | * | 3/1997 | Garcia ....................... 280/789 |
| 5,722,688 A | * | 3/1998 | Garcia ....................... 280/789 |
| 5,924,754 A | * | 7/1999 | Kuhns ..................... 296/26.15 |
| 6,113,338 A | * | 9/2000 | Smith ........................ 414/482 |
| 6,120,235 A | * | 9/2000 | Humphries et al. ......... 414/563 |
| 6,149,360 A | * | 11/2000 | Billotte ....................... 410/37 |
| 6,290,450 B1 | * | 9/2001 | Humphries et al. ......... 414/563 |
| 6,527,495 B2 | * | 3/2003 | Humphries et al. ......... 414/563 |
| 6,767,172 B2 | * | 7/2004 | French et al. ............... 414/481 |

FOREIGN PATENT DOCUMENTS

| | | |
|---|---|---|
| AU | PR7398 | 9/2001 |

\* cited by examiner

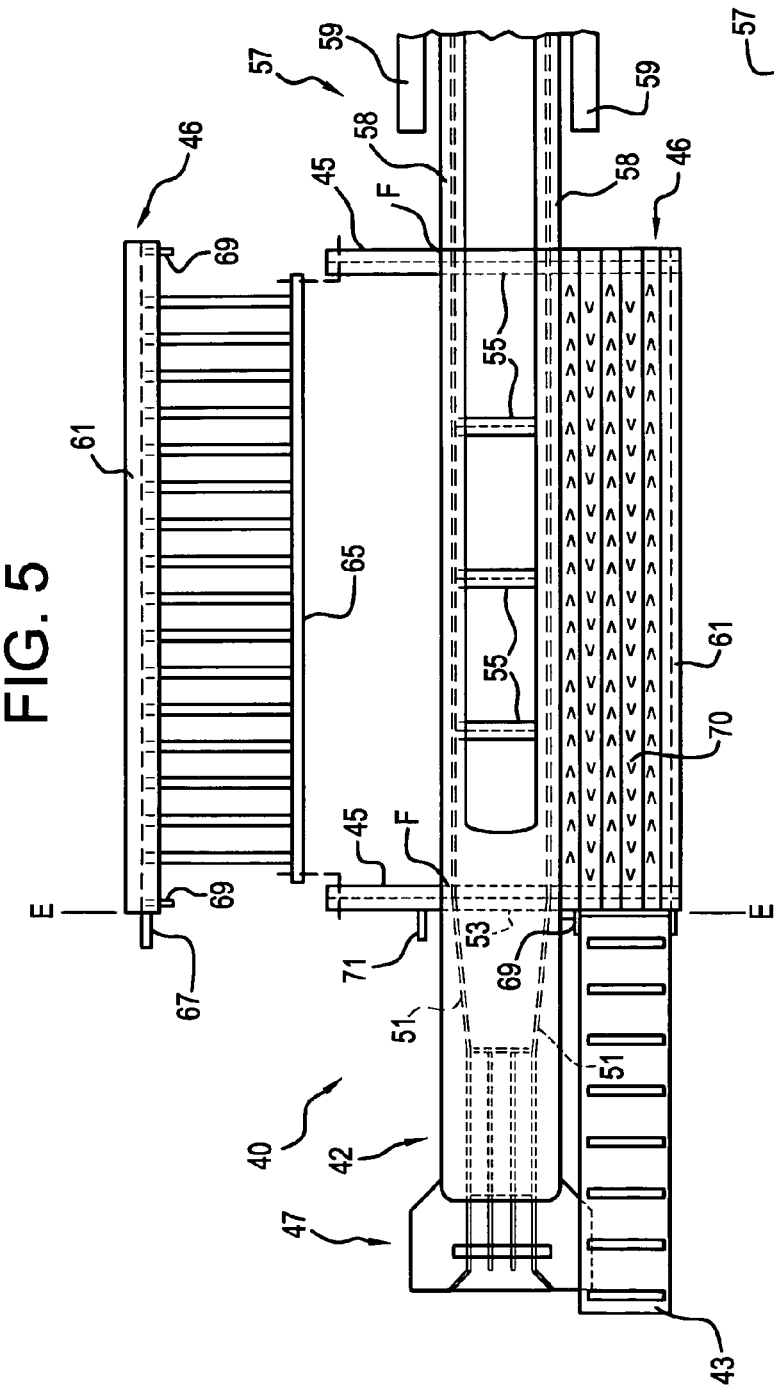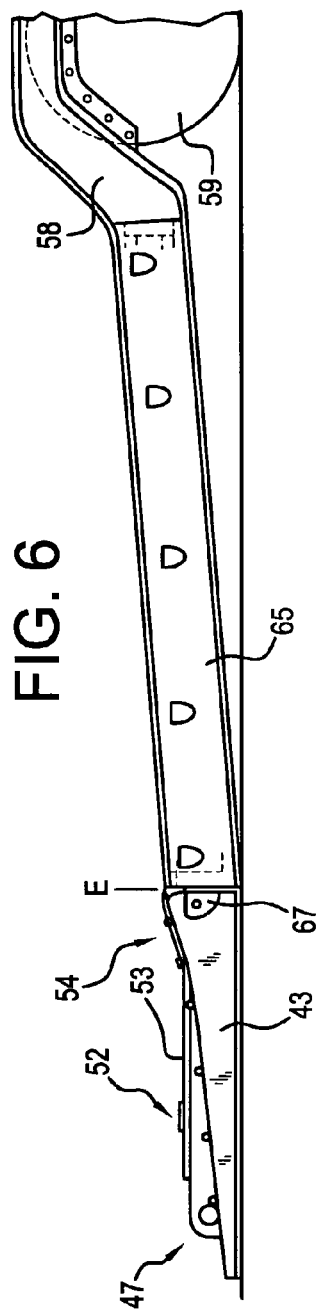

FRONT LOADING TRAILER AND METHOD OF USE

This application claims priority under 35 USC 119(e) based on provisional patent application Nos. 60/444,867 filed on Feb. 5, 2003, 60/458,042 filed on Mar. 28, 2003, 60/461,795 filed on Apr. 11, 2003, and 60/467,132 filed on May 2, 2003.

FIELD OF THE INVENTION

The present invention is directed to a front loading trailer and a method of use, and in particular, to a trailer system that employs a box beam construction at a front end thereof that allows loading of small equipment without compromising the trailer load capacity for heavy duty equipment, and is modular in nature.

BACKGROUND ART

In the field of heavy duty mining or construction, a number of different types of trailers (often referred to as lowboys) are utilized to move equipment such as shovels, earth moving apparatus and the like. Some trailers are rear loading meaning that the equipment to be hauled is loaded onto the trailer bed from the trailer rear, whereby the front end is used for hitching the trailer to a hauling vehicle.

Other trailers are front loading, wherein a front end portion of the trailer serves a dual capacity as a hitching point for trailer movement, and a loading/unloading point for equipment to be hauled.

FIG. 1 shows a typical lowboy trailer 90 having a trailer bed 91 for supporting heavy machinery 92, a gooseneck hitching assembly 93, a hauling vehicle 95, trailer wheels 97 (one shown), and a trailer axle assembly represented by numeral 99. The gooseneck hitching assembly 93 is disclosed in Smith's U.S. Pat. No. 5,435,586, which is herein incorporated by reference in its entirety. Other heavier duty trailers of this type can be used with a drive for the rear wheels.

As shown in FIGS. 1-2B, the trailer 90 has a front end assembly 101 that links to center support rails 103 and outside rails 103' at an interface 102, the rails 103, 103' extending longitudinally along at least the trailer bed length. Generally, the center rails 103 extend beyond the trailer bed to provide support for the axle assembly 99. Although not shown, wooden or other material decking extends along the support rails 103, 103' to provide a travel and support surface for the equipment during loading, unloading, and transport.

The assembly 101 is formed with a box beam construction. That is, a number of plates and support members are arranged and connected together to form an integral box-like structure that can transmit forces applied during raising of the trailer to the trailer support rails 103, 103' and cross members as described below. The assembly 101 includes a top plate 104, which further comprises two ramp sections 105, and a center section 107. Also provided are side walls 109 and a bottom plate 111. A pickup shaft 113 is positioned in an opening 114, the shaft 113 held in place by four vertical plates 115 that extend between the interface 102 and the bottom plate 111. The center plate 107 also has a raised contact surface 117 to receive the tow member 127 of the hitch assembly 93, but the entire plate could act as a contact surface if so desired. A number of other longitudinal members make up the box beam, including insert plates 116 that extend beyond the interface 102, and angled insert plates 118. Each of the insert plates provides further strengthening against the load traveling across the ramp plates 105. U-shaped plates 120 extend beyond the interface 102 and a portion thereof buts against a web of each rail 103, 103', the plates 120 facilitating attachment between the assembly 101 and the rails 103, 103'. In general, the various plates and members are either welded or bolted together to form the overall assembly 101.

As shown in FIG. 2B, the trailer bed with rails 103, 103' (preferably I-shaped in cross section) employs cross members 106 (also preferably I-shaped) that are arranged at spaced apart intervals along the trailer bed length.

Prior to an exemplary loading procedure and with reference to FIG. 1 again, the front end assembly 101 of the trailer is laid on a ground surface, and the hitch assembly 93 is removed. Equipment is then driven onto the trailer bed, and the trailer front end is lifted in the following manner. With the tow member 122 in a raised position by retraction of a piston (not shown) connected at 124, the hitch 123 of the assembly 93 is positioned beneath the pickup shaft 113. The grab hook 125 pivots downwardly to engage the shaft 113 so that it is securely held by the hook 125 and hitch 123. Then, the tow member 122 is lowered to contact the center plate 107 and contact area 117. Once in contact with the center plate and contact surface, further extension of the piston raises the trailer as shown in FIG. 1. During this lifting operation, the lifting force is tremendous, and a heavy duty box beam construction, including the ramp portions, is required to evenly distribute the load initially applied to the front end assembly of the trailer to the ends of the four longitudinal support rails 103, 103'. Because of immense trailer loads, i.e., the support rails are typically dimensioned with 30 inch heights, and the box beam dimension at the interface 102 approximates this height. The front end assembly then tapers from this height to its free end.

One problem with these types of lowboy trailers is their inability to easily accommodate equipment that may be smaller in size than the machinery that the trailer typically supports. Many of the small mining or construction machines or equipment have components with low ground clearances due to their size. As a result and referring to FIG. 3, when loading a drilling machine 200, for example, the machine component 201 may only have a ground clearance of 18 inches. Further, the component 201 is relatively close to the tracks 203 of the machine 200. Consequently, if the machine were to be loaded the way large equipment is loaded, the component 201 would strike the center plate 107 before the tracks 203 of the machine reaches the trailer ramps 208. Consequently, alternative means must be employed to load these smaller machines onto the trailer bed. Loading blocks placed either at the trailer front end or at spaced apart intervals from the trailer front end have been used. However, in certain instances, the loading blocks must be made higher than the front end initial height, thereby causing the equipment to travel over a hump, and creating a state of instability. Other remedies include side loading of the trailer, although this creates safety issues, and runs counter to the purpose of the trailer's intended front end loading.

Therefore, a need has developed to provide a trailer, which can not only load 200-400 ton and heavier equipment, but is also versatile enough to load smaller equipment without requiring modification of the loading procedure.

Merely changing the slope of the trailer by reducing the height of the support beams is not a solution to the problem due to the loads that the trailer encounters during its lifting operation. Such a change would compromise the load bearing ability of the front end assembly.

The invention solves the problem faced by the prior art by providing a trailer front end assembly that is dimensioned to receive small equipment having components with a low ground clearance, while still maintaining the capability of supporting large equipment during a loading operation. The invention eliminates the need for another trailer, or time-consuming and/or unsafe loading procedures with a large trailer. The invention also provides a reduction in manufacturing costs and trailer assembly time/costs by simplifying the design of the front end assembly, and reduces the number of load bearing components.

SUMMARY OF THE INVENTION

It is a first object of the present invention to provide an improved front end loading trailer using a longitudinally/centrally located box beam construction.

It is another object of the present invention to provide a front end loading trailer that is capable of loading small and large pieces of equipment without having to alter the loading method for the small equipment.

Yet another object of the invention is a method of loading a piece of equipment onto a front end loading trailer using a gooseneck hitch, wherein forces applied during hitching are translated longitudinally and centrally along the trailer so that the trailer front end can be tapered to dimensions permitting small equipment loading.

One other object is a front end loading trailer that is modular in design, so that the trailer can be easily assembled on site.

Still another object of the invention is a method of trailer assembly or construction, wherein a vast majority of the trailer components can be bolted together on site.

A further object of the invention is the capability of combining over-the-road use of trailer with off-road use for ease of transport to a site, and the ability to use the trailer for hauling light duty items over-the-road.

One other object of the invention is the use of an adapter block assembly to allow the inventive trailer to be used with gooseneck hitches designed for prior art trailers.

Yet another object of the invention is the use of a trailer mounting arrangement that can be fixed or removable and that allows the elimination of bends in the trailer rails, while still permitting a rigid support of the trailer rear axle, and providing a site for easy fender attachment and resting of equipment components when loaded onto the trailer.

Other objects and advantages of the invention will be apparent as the description thereof proceeds.

In satisfaction of the foregoing objects and advantages, the present invention offers a number of improvements in the field of front loading trailers. One improvement involves trailers known to have a front loading end, a trailer bed, and a rear wheeled end. The trailer has a number of longitudinally aligned trailer bed support rails, and a front end assembly, whereby the front end assembly has a pick up shaft arrangement, a hitch contact area, and opposing ramp sections. The invention provides a tapered box beam extending from the pickup shaft arrangement that links to a center end portion of the trailer bed. The center portion is spaced from sides of the trailer bed, and the tapered box beam includes at least two tapered box beam rails. An end of each tapered box beam rail is aligned with a respective trailer bed support rail. The box beam uses the tapered box beam rails as side walls thereof, with the box beam top and bottom portions completing the box configuration. The top portion of the beam also includes the hitch contact area.

The trailer can include at least a pair of tapered side rails, the at least two tapered box beam rails disposed between the tapered side rails. Cross members are provided to interconnect the side rails, successive heights of the cross members following the tapers of the side rails and the at least two tapered box beam rails.

The invention also entails a method of lifting lowboy trailers that have a trailer bed and a gooseneck hitch, wherein a hook of the hitch couples to a pickup shaft, and a tow member of the hitch applies a lifting force to the trailer front end assembly to pivot the gooseneck and raise the trailer. According to the improved method of the invention, a tapered box beam is provided that extends from the pickup shaft along a trailer length.

The trailer is lifted using the gooseneck hitch whereby, during lifting, the tapered box beam distributes the lifting load along the box beam length and to a central end portion of the trailer bed that is spaced from the sides of the trailer bed. The method can employ a tapered box beam that includes the tapered side rails and the cross members. The tapered box beam arrangement distributes the lifting load along a center portion of the front end assembly, and also distributes at least a portion of the lifting load to a center portion of an end of a trailer bed of the trailer, the center portion being spaced from sides of the trailer bed. The load is distributed laterally of the center portion to the side rails using the cross members.

Another aspect of the invention uses a trailer having a front loading end and a rear wheeled end, with the trailer having a number of longitudinally aligned trailer load support rails and a front end assembly. The front end assembly has a pick up shaft arrangement, hitch contact area, and opposing ramp sections. This trailer includes a central box beam including top and bottom portions, and at least tapered box beam rails as walls of the box beam. The central box beam extends from the pickup shaft arrangement to at least a trailer bed front portion, with the at least two support rails aligned with two central support rails that further extend a length of the trailer. A trailer bed assembly is provided that has a pair of trailer bed side sections and cross members, each trailer bed side section linked to the central support rails via the cross members. A pair of ramp sections are provided that are removably attachable to the trailer bed assembly at the trailer bed front portion, the box beam being longitudinally disposed between the ramp sections. The cross members can extend through the center support rails or extend laterally and outwardly from the center support rails. The trailer can include at least one axle assembly attached to the at least two trailer support rails or a removable axle assembly attached to rear ends of the center support rails.

In yet another aspect of the invention, a method of constructing a front end loading trailer comprises providing a central box beam including top and bottom portions, and at least two tapered support rails, the central box beam extending from a pickup shaft arrangement to at least a trailer bed front portion, the at least two tapered support rails aligned with center support rails that extend a length of the trailer. Trailer bed side sections are provided and are attached to cross members linked to the center support rails to form the trailer bed. The cross members can extend through the center support rails, or extend laterally and outwardly from the center support rails.

A ramp section can be attached to either or both of the central box beam or the trailer bed assembly, the box beam being disposed longitudinally between the ramp sections. The ramp sections can be removed and reinstalled from the trailer.

The trailer or method described above can employ tapered rails having webs and opposing flanges, the flanges forming part of the top and bottom portions of the box beam.

The trailer side bed sections linked to the central support rails can employ link plates and pins or opening-containing flanges and pins to connect to the cross members. Each side bed section can also include a longitudinal rail between sides thereof, the longitudinal rail positioned to absorb crash down forces during trailer loading. The side bed sections can have outer side rails, which are lighter in duty than the longitudinal rail designed to absorb the crash down impact.

The inventive trailer or method of constructing can also use a removable axle assembly attached to ends of the center support rails. The removable axle assembly can be a single assembly for off-road use or a dual assembly for over-the-road use. When using the dual assembly, one of the dual assemblies is attached to ends of the center support rails.

When constructing the trailer, the trailer can be used in an over-the-road use and then retrofitted for off-road use. In this mode, and prior to attaching the trailer bed side sections to the center rails, the trailer with the center box beam and center rails is configured with a width to allow over-the road travel to and to form an over-the road trailer. In this configuration, the dual over-the-road use axle assembly is attached to the over-the road trailer. The over-the road trailer is driven to a site so that the trailer bed side sections and a single off-road use assembly replaces the over-the-road dual axle assembly to form an off-road trailer. One or both of the single off-road use axle assembly and trailer bed side sections can be loaded onto the over-the-road trailer prior to the driving it to the off-road destination site The trailer or method of construction can utilize at least one adapter block mounted to the trailer for movement between a stored and an operating position. The adapter block rests on a top surface portion of the trailer in the operating position, the block having a two receiving surface for trailer lifting. As an alternative to one block, a pair of separately pivotal blocks can be employed.

In yet another aspect of the invention, the trailer support rails are configured in a straight alignment at a rear end portion thereof. A pair of rear axle mounting plates are provided that are adapted to connect to respective rear ends of the trailer support rails in a vertical orientation, with the rear axle mounting plates rigidly supporting a rear axle. The axle mounting plate can be welded to the rear ends or removably attached thereto. The plates can include surfaces for resting of one of more components being hauled on the trailer. Fenders can be mounted to and extending laterally across the rear axle mounting plates. Portions the plates containing the resting surfaces can extend through openings in the fenders.

BRIEF DESCRIPTION OF THE DRAWINGS

Reference is now made to the drawings of the invention wherein:

FIG. 5 shows a top view of another and partially disassembled embodiment of the invention;

FIG. 6 shows a side view of the embodiment of FIG. 5; and

DESCRIPTION OF THE PREFERRED EMBODIMENTS

The present invention offers significant advantages in the field of hauling machinery of various sizes. Instead of having to employ loading blocks, side loading, or having more than one trailer, one trailer can be utilized for hauling equipment of large and small size. In addition, the overall cost of the trailer is reduced since the box beam construction of the front end loading assembly is greatly simplified.

In addition, the inventive box beam concept of the invention can be incorporated in existing trailers, so that a trailer owner does not have to purchase another trailer. This is a significant attraction for the prior art trailer owner since these trailers are designed to haul equipment weighing hundreds of tons, and are quite expensive.

Another advantage of the invention is a trailer design, which is modular in concept, and permits the trailer to be shipped and/or assembled in a cost efficient manner. The trailer design incorporates the central box beam construction, and allows for the use of separate ramp sections, and separate trailer bed side sections.

Figure 4A:
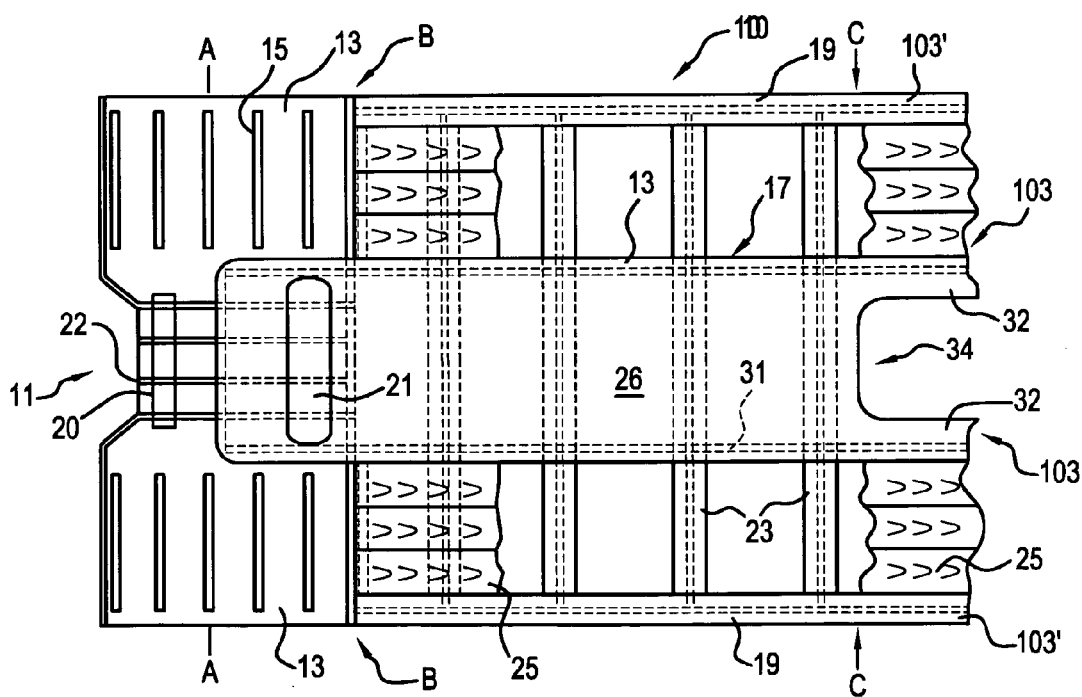
FIG. 4A shows a top view of one embodiment of the invention.
Figure 4B:
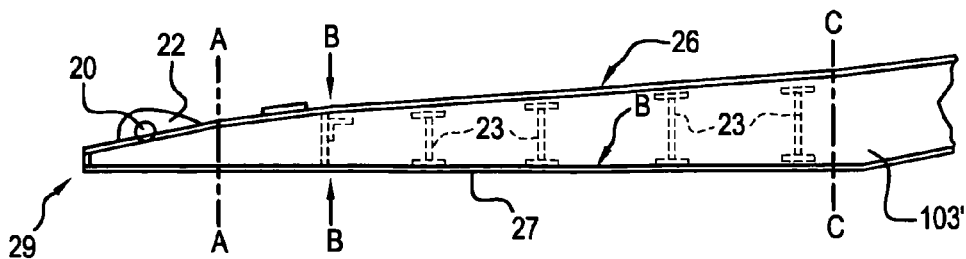
FIG. 4B shows a side view of the embodiment of FIG. 4A.

FIGS. 4A and 4B show a partial view of one embodiment of the invention that is designated by the reference numeral

10. The trailer includes a pickup shaft arrangement 11, opposing ramp sections 13 with cleats 15, a longitudinal and tapered box beam assembly 17, tapered outside support rails 19 (preferably I-shaped in cross section), a raised tow member contact area 21 (optional), and cross members 23. Decking 25 that spans the cross members 23 and support rails 103, 103' is removed in part to show detail.

The open part of the pickup shaft arrangement 11 is essentially the same as used in the prior art trailer, with a shaft 20 and vertical plates 22, the plates 22 extending from the end of the arrangement 11, becoming part of the box beam assembly 17, and extending to where the ramp sections 13 meet the outside members 19, interface B.

The box beam assembly 17 includes top and bottom plates 26 and 27. Top plate 26 longitudinally extends from interface A to interface C where the box beam assembly 17 links to the support rails 103. These rails can be the same type as used in the prior art design, which are substantially greater in height and only match the tapered rails where they attach. The bottom plate 27 can extend for the same length as the top plate, or as shown, extend to the end 29 of the trailer 10 to anchor the vertical plates 22. The plates 26 and 27 extend between flanges of the two tapered longitudinally disposed rails 31, such that the flanges become part of the top and bottom surfaces of the top and bottom plates. Of course, other beam construction could be employed, for example, top and bottom plates would be placed above/below the rail flanges.

Figure 2A:
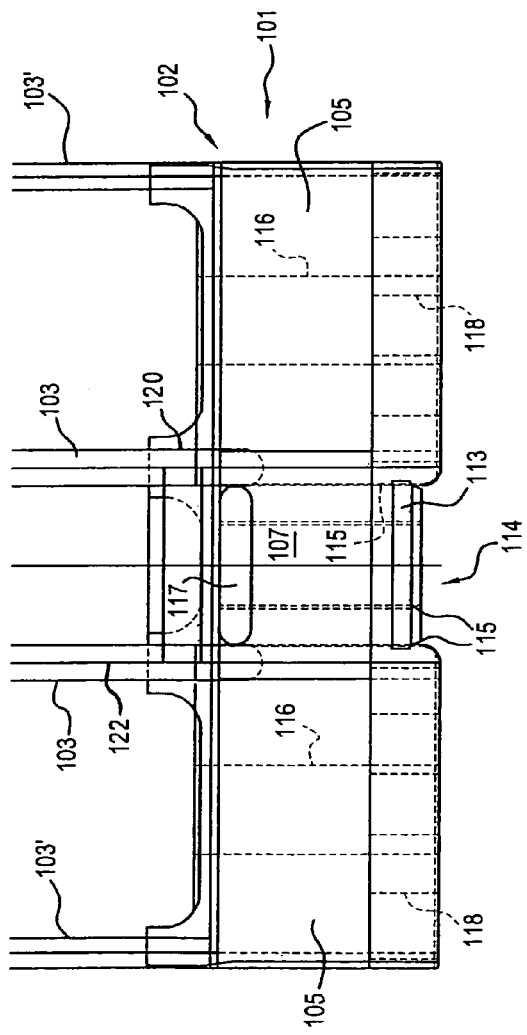
FIG. 2A is a plan view of the front end assembly of the prior art trailer of FIG. 1.

The rails 31 are similar to the outside tapered rails 19, except that the outside rails 19 extend between interface B and interface C whereas the rails 19 terminate at the ramp sections 13. The tapered rails 31 extend between interfaces A and C, and align with rails 103 at interface C. At interface C, rail flanges 32 of the rails 103 are shown. The u-shape member 34 facilitates attachment of the rails 31 to rails 103, similar to the connection at interface 102 in FIG. 2A.

The cross members 23 extend between the outside rails 19, and pass through the openings (not shown) in rails 31. As shown in FIG. 4B, the heights of the cross beams 23 taper downward towards the trailer end 29, the successive change in height corresponding to the taper of the beams 19 and 31.

Figure 1:
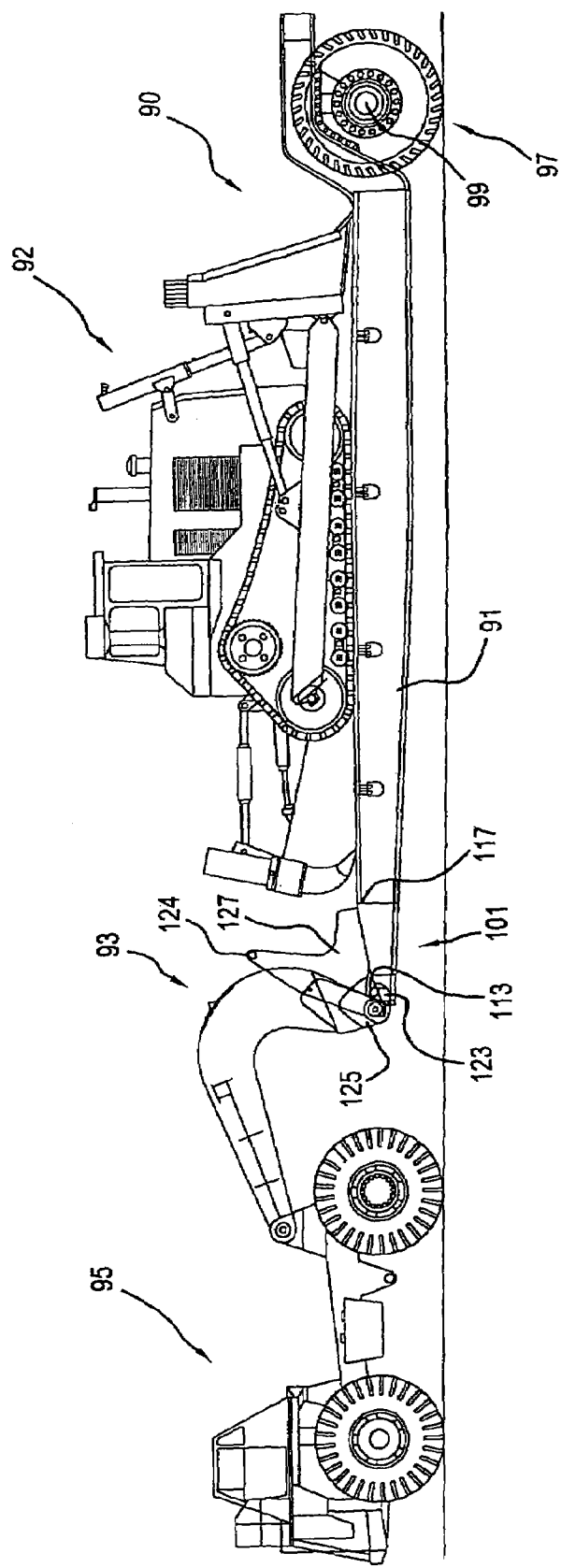
FIG. 1 shows a typical prior art trailer.
Figure 2B:
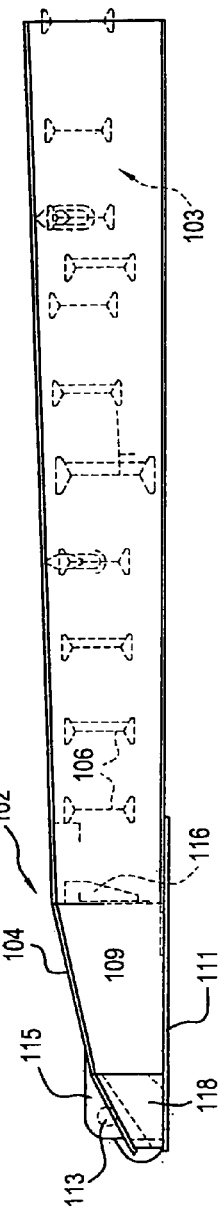
FIG. 2B is a partial side view of a prior art front end assembly and trailer bed of FIG. 1.
Figure 3:
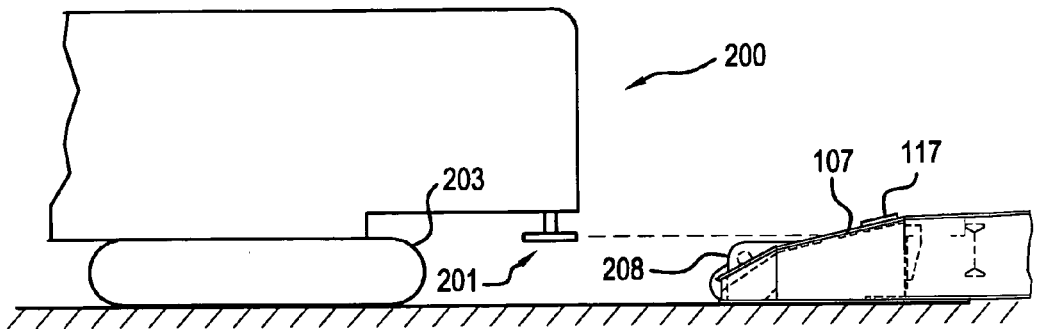
FIG. 3 shows an initial loading step of the trailer of FIG. 1 with a piece of small equipment.

The box beam assembly 17, in effect, replaces the entire front end box beam assembly of the prior art assembly as shown in FIGS. 1-2B. Thus, the load imposed when the tow member contacts the tow member contact area 17 is first transmitted to the box beam 17. At least a portion of the load is then distributed amongst the cross members 23 to the outside rails 19, and ultimately to the outer support rails 103', a remainder of the load being carried by the center support rails. With the box beam, the rails 19 and 31 can be tapered without loss of load bearing capability, and provide a front end loading assembly of reduced height as compared to the prior art design. For example, at end 29, a height of 6 inches can be employed and a height of 16 inches can be used at interface B. This 16 inch height contrasts with the 30 inches in the prior art design. The 30 inch height found in the prior art is moved further away from the trailer end 29 to interface C wherein the tapered beams 19 and 31 meet the support rails 103 and 103'. With the reduced height at interface B, and small piece of equipment such as the drilling machine of FIG. 3 can be loaded onto the trailer without the need for side loading or loading blocks or ramps.

It should be understood that the box beam construction that connects to the rails 103, 103' could be employed without the rails 19, such that the load imposed on the box beam 17 would be transmitted to the central rails 103 of the trailer bed. The next embodiment better illustrates this aspect of the invention.

The box beam design can also be used in conjunction with an existing trailer. That is, the front end assembly and a portion of the longitudinal support rails of the trailer 90 of FIG. 1 could be removed, leaving exposed ends of the rails 103, 103'. Then the box beam 17, with or without the cross members 23 and outer rails 19 could be used for connection to the exposed ends of the rails 103, 103'. The pickup shaft arrangement and ramps could be attached to the box beam 17 before or after attachment to the exposed ends of the rails 103, 103'.

The presence of the centrally aligned box beam 17 also allows for a new method of trailer construction, and eliminates the need to involve the ramp sections in load bearing duty. Because of the box beam 17, the ramp sections merely have to support the load applied when the equipment is traveling over the ramp sections, and the ramp construction can be greatly simplified. The ramp sections do not have to be integral parts of the front end assembly for trailer lifting as is the case in the prior art designs. This feature is illustrated in connection with the alternative trailer design discussed below.

FIGS. 5 and 6 show this alternative trailer design that employs the central box beam construction, and further exemplifies removable trailer ramp and bed sections. This trailer design allows for a much simpler trailer construction, wherein field welding and painting tasks are greatly reduced, thereby significantly reducing the time of trailer assembly. The trailer is designated by the reference numeral 40 and includes a center box beam 42, removable ramp sections 43 (one shown), removable/separable main cross members 45, and removable/separable trailer bed side sections 46.

The box beam 42 incorporates the box beam construction concept from FIGS. 4A and 4B, but does so without the use of the trailer bed side rails and cross members. Moreover, the slope or the taper of the box beam 42 is shown as a combination of a flat section and a sloped section. This contrasts with the continuous slope shown FIGS. 4A and 4B. Either type of configuration of the box beam can be employed, or other slope designs as long as the height of the assembly is reduced for hauling small equipment.

In the FIGS. 5 and 6 embodiment, the box beam 42 carries the load imposed during trailer raising and transmits it to the center rails, whereas the FIGS. 4A and 4B embodiment transmits the load to all four rails 103, 103' via the box beam and side rails. As can be seen in FIG. 5, only the separable trailer ramps 43 are adjacent the box beam. Because of the length of this box beam 42 and center rails 58, for certain trailer design, the center components such as the box beam and rails 58 could be shipped separated, and welded together in the field.

The box beam 42 is adjacent a pickup shaft arrangement 47 which parallels the one shown in FIGS. 4A and 4B. The box beam 42 extends from the pickup shaft arrangement 47 to at least interface E, and can extend just beyond the interface line E. The box beam 42 includes two tapered support rails 51, a top plate 53, and a bottom plate (not shown). As with the embodiment of FIGS. 4A and 4B, the rails 51 are sized in height to allow small equipment loading. The configuration of FIGS. 5 and 6 shows the box beam as having a flat section 52 and a sloped section 54. The rails 51 would follow this profile. Of course, the profile of the box beam can vary, e.g., a continuous slope or the like. It should also be understood that flanges of the rails 51 form parts of the top and bottom plates, similar to that described in FIGS.

4A and 4B. The box beam 42 is attached to the center rails 58 in the same fashion as described in FIGS. 4A and 4B, the u-shaped member 60 allowing portions thereof to be welded to the webs of rails 58. The rails 58 also are provided with cross members 55, and extend to the trailer rear end 57. At the trailer rear end. The rails 58 are formed with a configuration allowing attachment of an axle assembly, the wheels 59 thereof shown.

The pair of removable trailer bed side sections 43 are provided, each including an outside rail 61, a number of cross beams 63, and an inside rail 65. The rails 58 and 61 have the same shape. The cross beams 45 can be attached to the outside rails 61 in any fashion, bolting, welding, or the like. A ramp lug 67 is located on an end portion of each rail 61 to assist in receiving the ramp section 43. Each rail 61 also includes a pin 69 to facilitate attachment to the main cross members 45 and box beam 42.

In order to assemble the trailer once all components are at an intended location, the box beam 42 and rails 58 are put in place, and raised off the ground for assembly. The removable main cross members 45 are slid through an opening in the box beam 42 and an opening in rails 58 (both not shown), and are bolted to the beam/rails at F. With the main cross members 45 secured in place, ramp lugs 71, similar to lugs 67, are bolted in place on one of the main cross members 45 at positions adjacent the center box beam 42.

The trailer bed side sections 45, with or without decking 70, are then positioned so that the pins 69 can engage openings (not shown) in ends of the main cross beams 45 and the rails 61 and beams 45 can be bolted together. If the decking is not in place, it can be installed at any later time.

The inner rails 65 are also bolted to the rails 58 to form the trailer bed. As explained above, the box beam 42 transmits the load to the center rails 58.

The ramp section 43 can be attached to the lugs 67 and 69 using pins, rods, or any known attachment technique. As noted above, because of the box beam 42, the ramp sections 43 have a much lighter duty construction than those used in the prior art trailers, and can be made removable or separable for ease of trailer construction. While the ramp sections 43 are shown attached to the trailer bed assembly comprising the main cross beams 45 and side sections 46, the ramp sections could be supported by the main cross members, the box beam, or any combination thereof.

Figure 7:
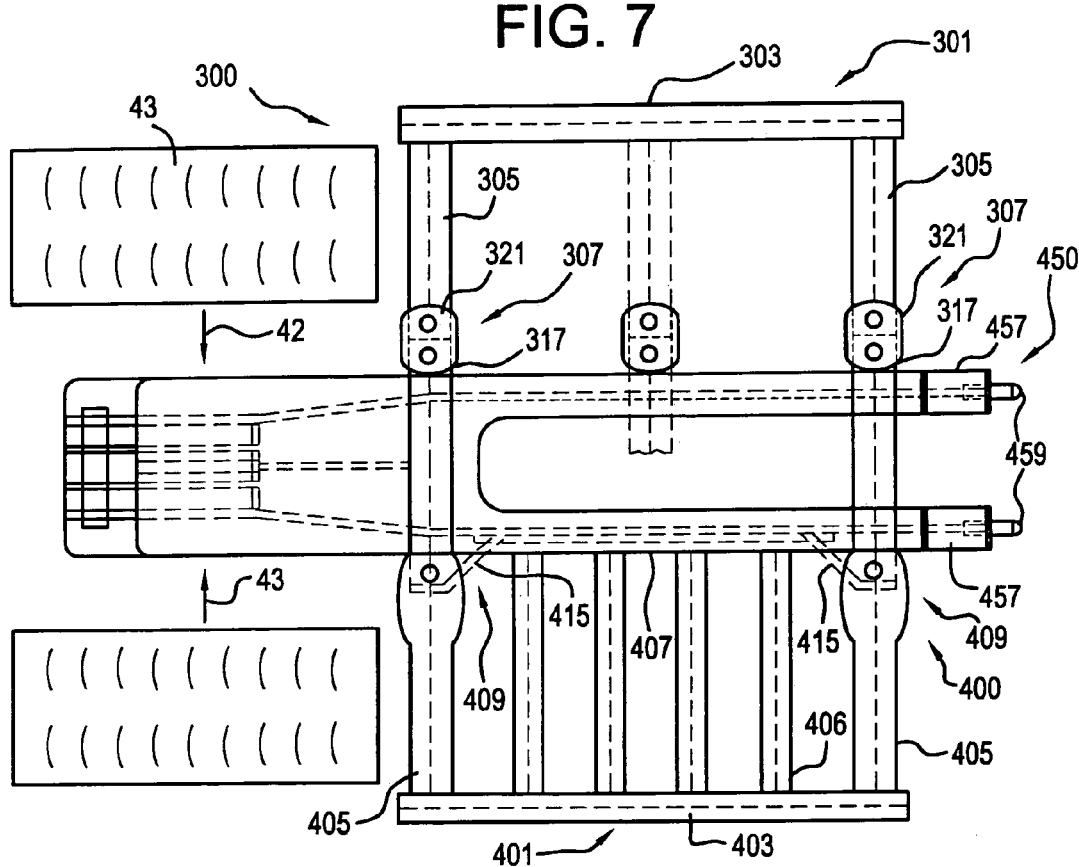
FIG. 7 shows a plan view and alternative attachment arrangements for the embodiment of FIG. 4.
Figure 8:
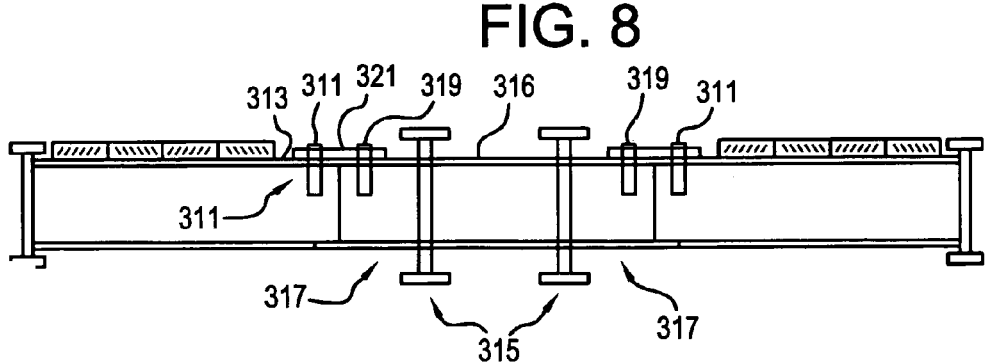
FIG. 8 shows a side view of one of the attachment arrangements of FIG. 7.
Figure 9:
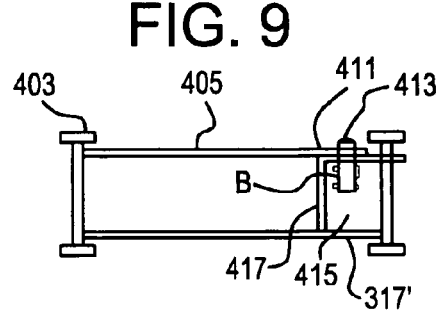
FIG. 9 shows a side view detail of the other attachment arrangement of FIG. 7.

Referring now to FIGS. 7-9, two alternative attachment arrangements are depicted for connecting the side bed sections to the central rails of the trailer. While each arrangement is shown in FIG. 7, it should be understood that each arrangement would be used with respect to both trailer bed sections. Referring now to FIGS. 7 and 8, one arrangement is designated by the reference numeral 300 and includes bed section 301 having an outside rail 303, a pair of cross beams 305 and an attachment arrangement 307. While two cross beams are disclosed, an optional one in phantom is depicted.

The free end 309 of each cross beam has a pin 311 extending upward from the top flange 313 of the beam 305. Extending through the center rails 315 are cross beams 316 similar to that shown in FIG. 4. However, in the embodiment of FIG. 7, only stubs 317 are needed for trailer side bed connection, each stub 317 also having a pin 319 extending from a top flange. The stubs 317 preferably match the profile of the cross beam 305, e.g., both have an I-beam cross section, but non-matching profiles could be employed. The cross beam 316 can merely interface with the center rails 315 and does not have to extend through the center rails as described in the FIG. 4 embodiment. Each stub 317 is linked to the free end 309 by a link plate 321 having openings 323, one opening receiving pin 311 and the other opening receiving pin 319. Although not shown, the link plate 321 can be held in place by a cotter pin or any other fastener or the like so that the plate would not slip off the pins during trailer use. The stubs 317 can be attached to the rails 315 by welding, bolting, combinations thereof, or any other fastening means. In this arrangement, the free ends 309 of the cross members 305 are easily aligned with the stubs 317 for link plate positioning for rapid assembly and disassembly of the bed sections 301. As noted above, the cross beams 316 do not have to extend the full width of the trailer body as is the case with the FIG. 4 embodiment; they only have to extend between the center rails 315, and the stubs 317 facilitate the side bed section attachment.

Referring to FIGS. 7 and 9, an alternative arrangement is designated by the reference numeral 400 and shows a side bed section 401 having an outside rail 403, outer cross beams 405, inner cross beams 406, inside connecting plate 407, and attachment arrangements 409. The connector plate 407 is sized to rest on the lower flange of rail 315 and beneath its top flange, and interconnect the inner cross beams 406.

The arrangement 409 comprises an end flange 411 at the free end of each cross beam 405, each flange 411 having an opening sized to receive the upstanding pin 413 of the stub 317'. The stub 317' is similar to stub 317 in that it can match the profile of the cross beam 405, if so desired. In operation, the flange 411 merely has to be raised to drop onto the stub with pin 413 entering the opening in the flange to link the bed section 401 to the center rails 315. The connection can be secured with another fastener such as a cotter pin, nut, etc., or use the weight of the side section 401 itself.

The bed side section 401 also has a plate 415, which is angled with respect to a longitude of the trailer. The plate 415 extends from end 417 of the beam 405 to the inner connecting plate 407. The plate 415 and its connection to the plate 407 provides resistance to sway of the side bed section 401 with respect to the center rails 315.

Figure 10:
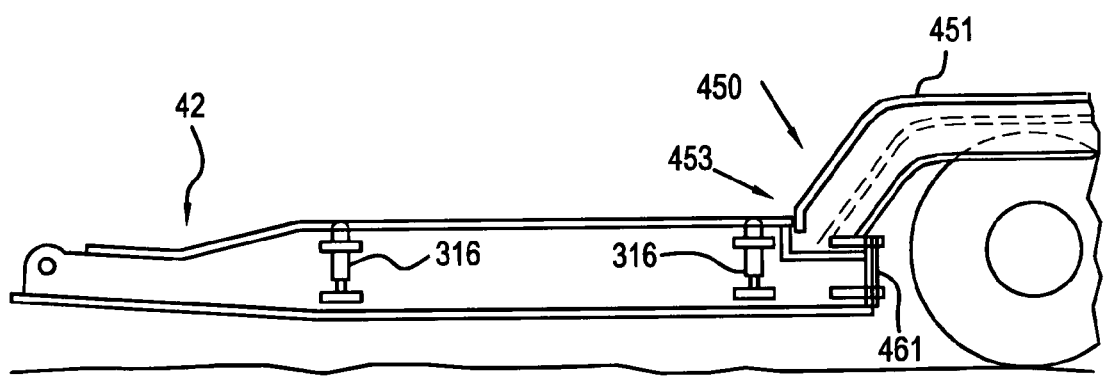
FIG. 10 is a side view of the trailer assembly of FIG. 7, including a removable rear axle arrangement.

FIGS. 7 and 10 also show a separable rear axle arrangement 450. With this arrangement, the center rails 315 terminate just beyond the trailer bed for attachment to the rear axle arrangement 450, as opposed to FIG. 4 wherein the rails extend for axle support. The arrangement 450 includes a pair of support rails 451, each having a connection end 453 and pin 455. Each center rail 315 has a reduced height section 457, a surface thereof mating with a corresponding surface of the end 453. Each rail also has a pin 459 extending therefrom. The axle assembly end 453 is linked to the reduced height section 457 using a link plate having two openings for engagement with pins 455 and 459. The link plate is held in place with suitable fasteners to secure the link between the axle and trailer bed. Of course, other connections could be employed to link the rear axle and its support rails to the center rails 315 if so desired.

The embodiment of FIGS. 7-9 offer improvements in that only stub sections 317, 317' are needed to attach the trailer side section, thus greatly easing trailer assembly and disassembly. The embodiment of FIGS. 7 and 9 is especially advantageous in that the link plates are not necessary, and attachment is even further simplified. In addition, a more sway resistant side section is created.

As noted above for FIG. 4, the box beam and rails 58 may be too long for shipment and may have to be shipped in pieces, and welded together in the field to form the entire assembly. However, and other than this welding, the entire trailer can be assembled by bolting. Further, painting of the components in the field can be minimized since most assembly uses bolting, and the components can be painted prior to delivery to a desired location.

The rails and cross members for use in the trailer are preferably made with I-beam cross sections, thus allowing for utilization of the web flanges for the plates of the box beam. But other types of rails could be employed, if so desired. The number of longitudinal rails and beams can also vary across the width and length of the trailer bed. For example, more or less than the three cross members 55 could be used in the trailer of FIGS. 5 and 6. Likewise, more than two rails could be employed as part of one of the disclosed box beams.

The materials of the various trailer components can be any type suitable for these types of loading carrying trailers.

It should be understood that, as a result of raising the front end of the trailer using the gooseneck hitching assembly, the means for distributing the lifting load down the center of the trailer and, if applicable, distributing at least some of the load laterally from the center for loading of various size equipment onto the trailer comprises the box beam assembly arranged adjacent the pickup shaft arrangement, or the box beam, cross members and tapered outer rails. In the FIG. 4A embodiment, the box beam cooperates with the lateral cross members, whereas in FIGS. 5 and 6, the box beam itself transmits the load to center rails 58.

While the trailer is described for use with a gooseneck hitching assembly and a pickup shaft, the box beam construction of the invention is equally applicable to other types of hitching mechanisms, e.g., hooks, eyelets, or the like on the trailer, and other hitch mechanisms on a hauling vehicle.

The invention also includes a method of lifting the trailer wherein, upon lifting, the box beam transmits the lifting load to a central portion of the trailer bed. Alternatively, if the tapered outer side rails are employed, at least a portion of the load is transmitted to these side rails and then to the trailer bed. The box beam construction acts as means for transmitting the load due to trailer lifting to the center portion of the trailer bed so that the front end assembly can be reduced in sized as compared to prior art front end assemblies and permit loading of smaller equipment without compromising the load carrying capacity of the trailer front end assembly.

Another problem with the loading of heavy equipment on trailers is the phenomenon known as "crash-down." When the piece of equipment is being loaded onto a trailer and is crossing from an inclined portion of the trailer to its flat bed portion, the junction between the two portions acts like a fulcrum or break-over point. Once the piece of equipment crosses the break over point, it can crash down onto the flat bed portion of the trailer. Since this equipment weighs hundreds of tons, and this weight is concentrated at the wheels or tracks of the equipment, the crash down force can be quite high, and damage to the trailer bed, e.g., crushing of cross beams, at the point of impact can occur. The crash down force can be excessively high if the operator of the equipment drives the equipment over the break-over point at too high of a rate of speed.

Typically, the prior art trailer bed is designed with center and outer rails, and the outer rails participate in load bearing. Often times, the centerline of the weight bearing tracks or wheels of the equipment to be loaded coincides with the location of these outer rails. For example, a trailer may be 20 feet wide, and the equipment may be actually 23 feet wide, with track widths of several feet. In this situation, the equipment is wider than the trailer and when the tracks crash down, they crash onto the outer rails of the trailer, and the crash down force is adequately absorbed by the outer rails.

Figure 11:
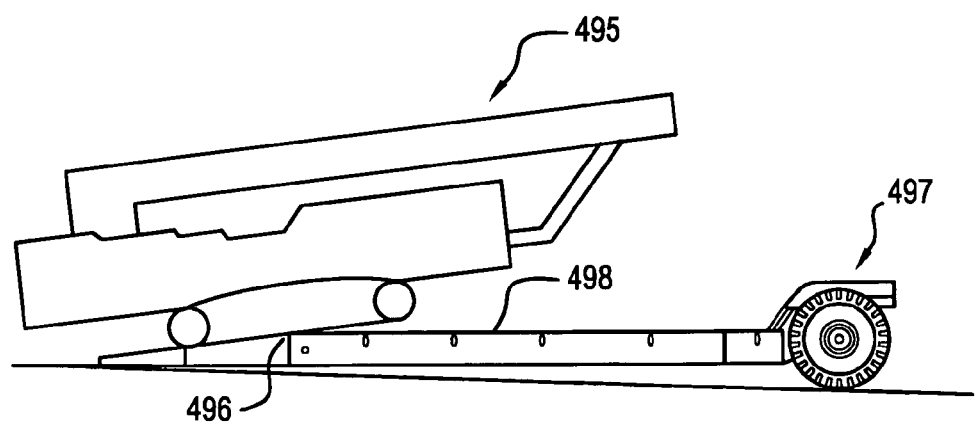
FIG. 11 is a schematic of a trailer crash down problem.

However, in other instances, the trailer is wider than the piece of equipment that is being loaded. In this scenario, the trailer may be 21 feet wide and the equipment may be 20 feet wide, with tracks that are three feet wide. This leaves approximately a 6 inch spacing between an outer edge of the equipment tracks and an edge of the trailer. In this instance, the centerline of the tracks is not positioned over the outer rails of the trailer, and the cross beams of the trailer take the entire crash down force. FIG. 11 illustrates this phenomenon wherein a drilling machine 495 is about to pass over a break-over point 496 of a trailer 497 using the low profile of the invention and crash down on the trailer bed at area 498. Although not shown in FIG. 11, the area 498 is spaced inward from the outside edge of the trailer; the area encompasses the longitudinal decking that covers trailer cross beams, not the outside rails. While the cross beams can be increased in size to account for this problem, the cross beams are still are not as effective as the outer rails in absorbing the crash down force.

Therefore, there is a need to improve the trailer design of the prior art and the design of the trailer of FIGS. 1-9, and to minimize or eliminate the effect of crash down during trailer loading.

Figure 12:
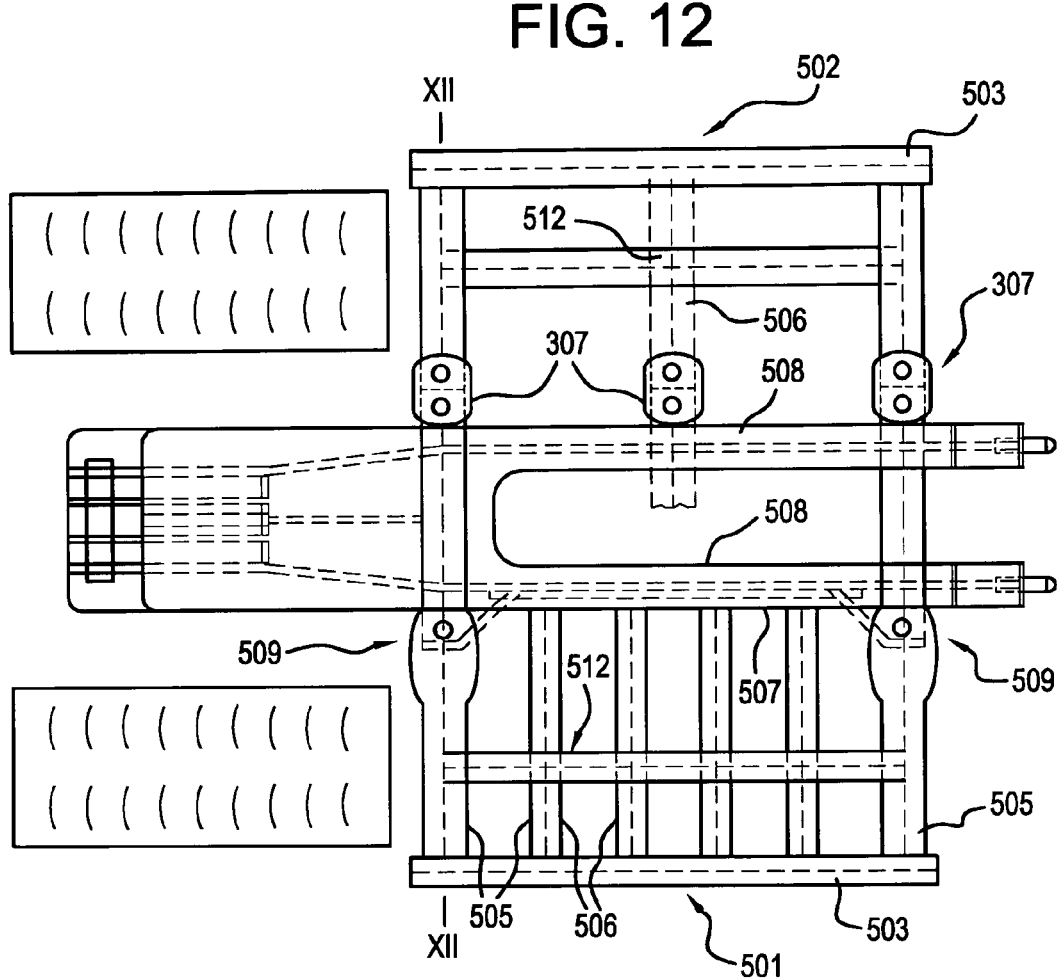
FIG. 12 is a top view of yet another embodiment of the invention.
Figure 13:
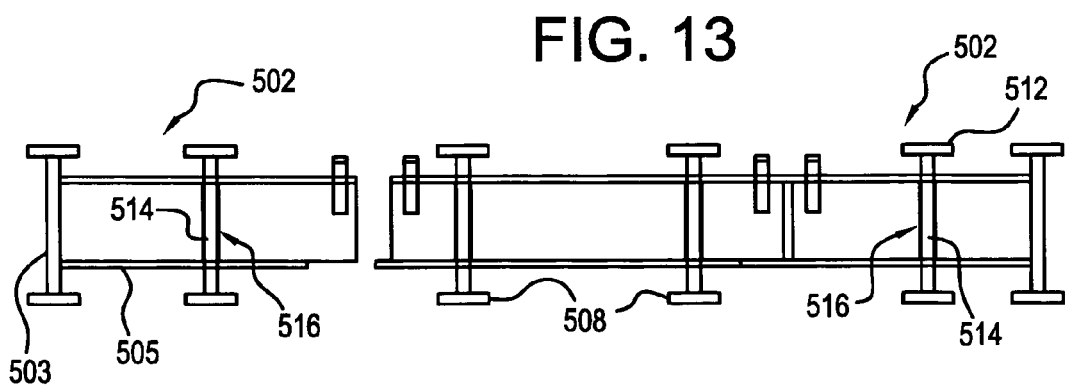
FIG. 13 is a side view along the line XIII-XIII of FIG. 12.

The present invention solves this problem through the use of an additional longitudinal rail in the removable trailer bed side sections of the trailer as shown in FIGS. 5-10. Referring now to FIGS. 12 and 13, trailer bed side sections embodying this aspect of the invention are designated by the reference numeral 501 and 502. Side section 501 is shown with the outer rail 503, outer cross beams 505, inner cross beams 506, inner connecting plate 507 and attachment arrangements 509. It should be understood that FIG. 12 is similar to FIG. 7 in showing two types of trailer bed side sections, each type using this aspect of the invention. Thus, a further description of the details of the side sections does not need to be repeated. Further and although not illustrated, the additional longitudinal rail concept can also be applied to the removable side sections shown in FIG. 5 or any other removable trailer bed side section where crash down would be a problem.

The side section 501 shows the longitudinal side section rail as reference numeral 512. The rail 512 is spaced between the outer rail 503 and the inner connection plate 507 and central rails 508. While the lateral spacing of rail 512 from vary between the outer rail 503 and central rails 508, a preferred spacing is one whereby the rail is aligned more or less with an anticipated longitude that coincides with a weight bearing longitude or centerline of equipment to be carried by the trailer. For example, if the trailer is 21 feet wide, and the targeted heavy duty equipment for primary use with the trailer is 20 feet wide with tracks that are three foot wide, (the edges of the tracks coinciding with the equipment width and weight bearing centerline falling about 1.5 feet inward of the equipment edge), the centerline of the rail 512 would be placed about 2.5 feet from an edge of the trailer. This rail alignment would then allow the rail 512 to absorb the crash down force when the equipment rides over the low profile section of the trailer.

FIG. 13 is a view along the line XIII-XIII of FIG. 12, with the modification that the attachment arrangements are shown as the link plate assembly 307 for both trailer sections, with one section attached and one removed. This differs from FIG. 12 that shows the two types of attachment arrangements as shown in FIGS. 8 and 9 above. When installing the rail 512, openings (not shown) are cut or otherwise made into its rail web 514, and the inner cross beams 506 are threaded through the openings. Then, each junction where the cross beams 506 intersect with the 512 is welded using web stiffeners (not shown) or other means to enhance the connection between the rail 512 and cross beams 506. The welds are represented by 516 and form an integral side bed section. The rails 512 are also welded to the outer cross beams 505. Of course, other attachment techniques could be used if so desired.

The combination of the removable side beds and longitudinal rails is also advantageous in that the cross beams are manipulated for threading through openings in the rails 512, a relatively easy task, during trailer construction. To retrofit an existing trailer wherein the cross beams are already linked together as part of the constructed trailer, the rail 512, rather than the cross beams, would have to be manipulated so that the cross beams could pass through the openings in the rail, a very difficult construction task.

Even though the presence of the low profile front end of the trailer will reduce the crash down force as compared to prior art designs, (the leading edge of the equipment is not as far above the trailer bed when the equipment is about to tilt onto the trailer bed), the rail 512 is still important in absorbing the crash down force, and preventing it from being absorbed just by the cross beams 506. The crash down force problem is drastically reduced or virtually eliminated by the presence of both the low profile trailer front end and the longitudinal rails in the side bed sections.

An added benefit of this aspect of the invention is that the outer rails 503 of the side sections can be lighter duty since the load of the equipment is borne by the rails 512. Thus, the cost of the additional longitudinal rails in the removable bed sections is offset by reducing the duty on the outer rails. Of course, the outer rail 503 could mimic the rail 512 configuration if so desired, but it is preferred to make the outer rail 503 of lighter duty design, i.e., smaller or thinner or the like, for the obvious benefits of material and cost savings.

In yet another embodiment of the invention, the inventive trailer can be used for both off-road and over-the-road applications as depicted in FIGS. 14-17. This is made possible with the use of the quick attachment suspension for the rear axle using pins and a link bar as shown in FIGS. 7 and 10 and the removable side bed features of the invention as shown in FIGS. 5 and 7. Referring to FIG. 7, the rear axle arrangement 450 allows for the removable attachment of the axle to the trailer and the connections 307/409 allow for removal or attachment of the side bed portions 301/401. Thus, the center trailer portion with the box beam construction and rails 315 can be made to match the maximum over-the-road width of 8 feet 6 inches, see FIG. 16.

Figure 14:
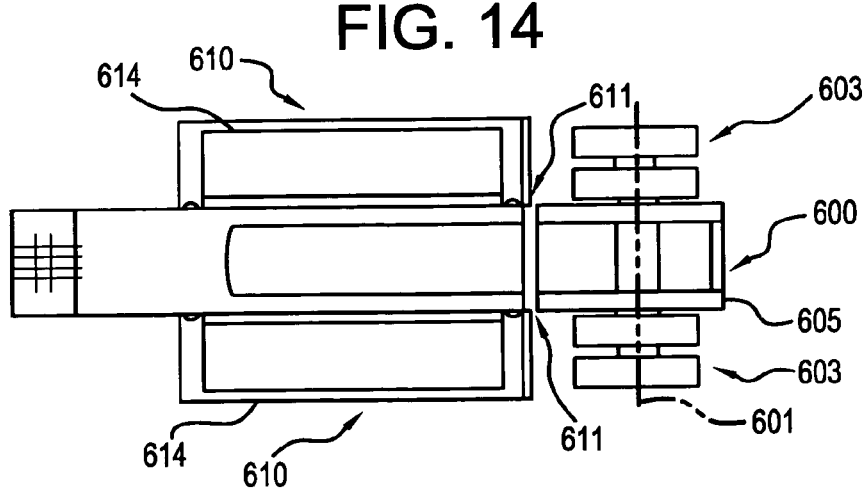
FIG. 14 is a top view of an off-road configuration of the inventive lowboy trailer.
Figure 15:
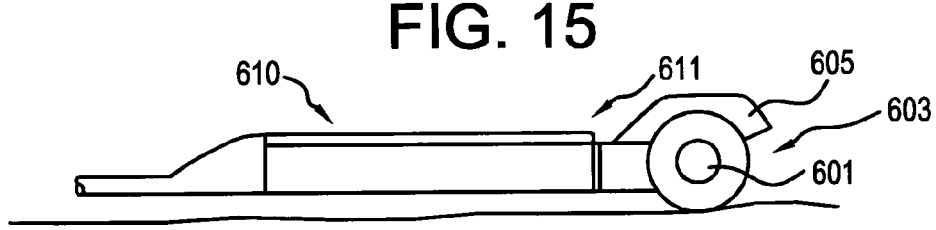
FIG. 15 is a side view of the configuration of FIG. 14.

The off-road configuration, wherein the trailer is nominally 20 feet wide, is best seen in FIGS. 14 and 15. The off-road rear axle arrangement is designated by the reference numeral 600 and includes a single axle 601 with double wheels 603 on each side of the axle frame 605. The arrangement is attached to the trailer designated as 610, the trailer 610 shown with the removable side portions 614 attached thereto by the pins and link bar arrangement 611 (shown schematically) which corresponds to that shown in FIGS. 7 and 10.

Figure 16:
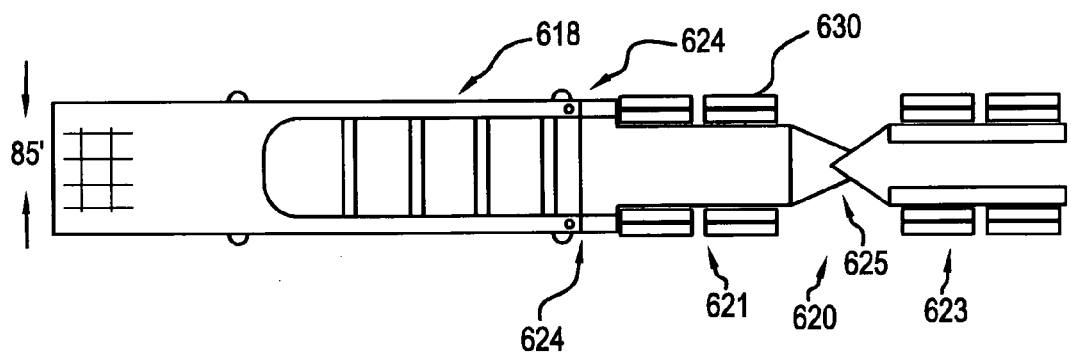
FIG. 16 is a top view of an over-the road configuration of the inventive lowboy trailer.
Figure 17:
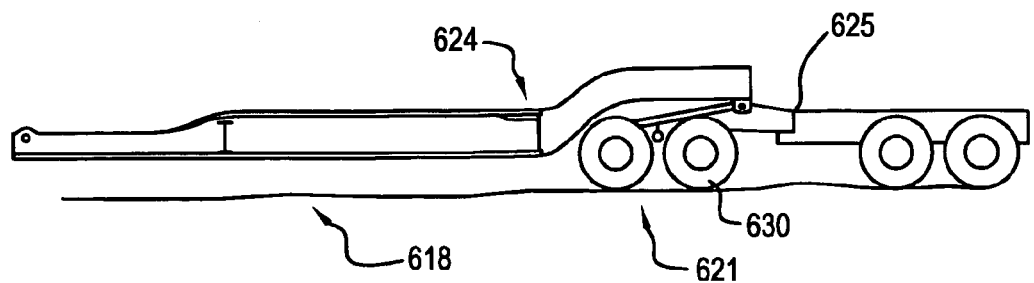
FIG. 17 is a side view of the configuration of FIG. 16.

The pins and link bar arrangement can be employed for over-the-road use as shown in FIGS. 16 and 17. The trailer bed 618 is attached by the pins and link bar arrangement to an over-the-road multiple axle hauler 620. The hauler 620 has two axle assemblies 621 and 623, frames thereof represented schematically since they are conventional in nature. Each assembly 621 and 623 is shown with eight tires 630, two pairs for each axle, although other arrangements can also be employed. Assembly 621 links to the trailer 610 at 624 and the assembly 623 links to the assembly 621 at linkage 625. The linkage 625 is conventional for these types of dual axle assemblies and does not require further description. The linkage 624 represents the quick attach design of FIGS. 7 and 10. While the hauler 620 representing multiple axles for over-the-road hauling is used in combination with prior art trailers, the present invention offers advantages by permitting the same lowboy trailer to be used for off-road and over-the-road use in a quick and efficient manner due to the quick attach suspension arrangement shown in FIGS. 7 and 10 and the removable side bed sections.

This capability is especially advantageous because the over-the-road configuration of FIG. 16 can be used to transport the lowboy trailer to a site and thus eliminate the steps of crating, shipping, unassembling, etc., an off-road trailer to the site as is done now. The axle assembly 600 and removable side bed portions 310/410 can be loaded onto the narrow trailer 618 and be hauled to the desired site. Once at the site, a crane can remove the axle assembly 600 and side bed portions from the trailer 618, and the dual axle assembly 620 can be unpinned and removed. The side bed portions and off-road axle assembly 600 can be then easily attached to the trailer 618 and the lowboy trailer is now ready for off-road use. The axle assembly 620 can then be returned using the vehicle that hauled the trailer to the site. Of course, the side bed sections and off-road axle assembly could be shipped to the site separately if so desired, but it is much more efficient to use the lowboy trailer in its over-the-road configuration for hauling. The over-the-road configuration is also beneficial in that the lowboy trailer can be used to haul lighter duty items over the road. For example, with the dual over-the-road axle assemblies, the lowboy trailer 618 can merely haul items other than the off-road trailer components described above. Therefore, the trailer 618 is multidimensional in its hauling ability.

Another aspect of the invention involves the use of an adapter block in combination with the low profile trailer front end. One drawback of the inventive low profile trailer front end is that the tow plate contact area 21, see FIGS. 4A and 4B, is disposed at a height lower to the ground than what is normally found on a prior art trailer. Consequently, the tow of the gooseneck hitch intended to work with the inventive trailer must travel a greater distance before it contacts the tow plate contact area, and this increased travel of the tow results in a reduced lifting capability for the trailer.

Figure 18:
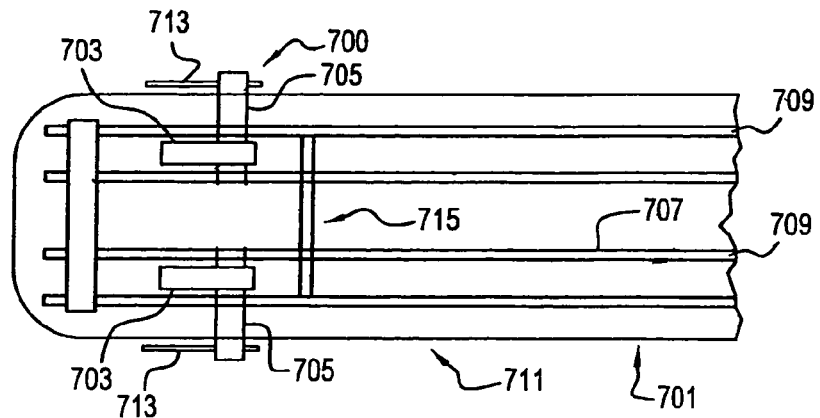
FIG. 18 is a schematic top view of an adapter block assembly installed in the inventive trailer.
Figure 19:
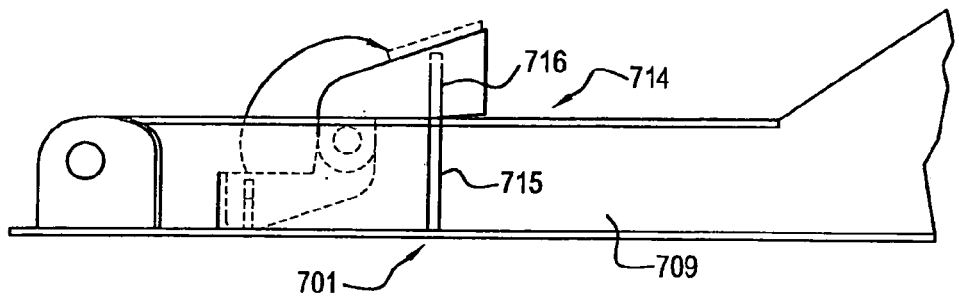
FIG. 19 is an enlarged side view of the arrangement of FIG. 18.

In response to this drawback and to accommodate older style gooseneck hitches, the low profile trailer can include an adapter block assembly 700 that is mounted to a low profile trailer 701, see FIGS. 18 and 19. The assembly 700 includes a pair of pivotable blocks 703, which are l-shaped, but other shapes can be used. Each block 703 rotates about a pin 705, with the pin mounted in the center and outside rails 707 and 709. One end of each pin 705 extends beyond the trailer lateral sides 711, with the pin end having a handle 713 that allows for rotation of the block 703 by an operator. While the blocks could be connected by one pin, for simultaneous rotation, it is preferred to separate the blocks so that an operator can rotate the blocks between their stored and operating positions without some type of a mechanical assist. Of course, a mechanical assist could be used, when using one or two blocks.

The blocks 703 are positioned so that in the operating position, they would rest on a toe plate contact area 714, which can be reinforced with a lateral plate 715 extending between the rails 707 and 709 to accommodate the load imposed when the toe contacts the blocks for lifting purposes.

FIG. 19 shows one block 703 in the operating position, with the block in a stored position shown in phantom. In use, an operator would grasp the handle 713 and rotate each block 703 from the stored position to the operating position once the trailer is ready to be lifted. The gooseneck hitch would be positioned for trailer lifting, and then would interact with the adapter blocks as part of the lifting operation. Once the gooseneck hitch is removed from the trailer, an operator can reposition the blocks 703 into the stored position to clear the trailer bed for travel of equipment.

The blocks can be shaped/formed in any number of configurations providing that the configurations are designed to handle the load imposed when the two contacts the blocks for trailer lifting. For example, the blocks could be a hollow type and be formed of parallel plates with end plates and one or more webs 716 for strength purposes. Alternatively, the blocks could be of solid construction, or a combination of solid and hollow construction. Further, while a pivoting arrangement is disclosed, other types of movable arrangements could be employed whereby the blocks would move between an operative position to receive the tow and a storage position where they would be out of the way for travel of equipment to be loaded on or unloaded from the trailer, e.g., sliding, reciprocating or the like. While a pair of adapter blocks are shown, one large one could be used and positioned between the center rails, although again, it may be difficult to manually move the block without some mechanical assist.

In connection with the modular aspects of the invention, i.e., removable side bed portions, and the removable axle assembly, another feature of this modularity is an improved axle mounting arrangement.

In prior art trailers, it is common to form a bend in or "arch up" the rails at the rear end of the trailer to provide a space for the rear axles and accommodate their mounting. These mountings typically employ springs or walking beams which are placed above the axles and mounted to the underside of the suspension rails.

Rails with bends in a rear portion thereof have also been used in the prior art lowboy trailers described above; but in these cases, the axles can be rigidly mounted to the suspension rails. Unlike many other trailer designs, trailers that are designed for heavy duty equipment are of such a length that the trailer rails themselves act as a suspension, thereby allowing a rigid connection between the axles and the suspension rails. These bend rail ends also serve as a rest for shovels or buckets of equipment being hauled by the trailer and mounting locations for fenders. However, the configuration of the rails makes it difficult to easily mount fenders while at the same time allowing a surface for resting pieces of the equipment being hauled.

The use of the bent rails in trailer construction is problematic in the manufacturing process. It is very time consuming and labor intensive to form two bends in each of the rails as shown in the prior art trailer of FIG. 1 and even the embodiments of the invention, see for example FIGS. 6, 10, and 17. Thus, the elimination of the bend in these rails without compromising the trailer integrity and functionality would provide a significant reduction in the cost of making the trailers.

The present invention solves this problem through the use of an axle mounting assembly that allows the use of straight rails to support the rear axles for the trailer. In this way, there is no need for bending of the rails. The axle mounting assembly also offers more flexibility in mounting of fenders for the wheels and providing rests for buckets or the like of equipment.

Figure 20:
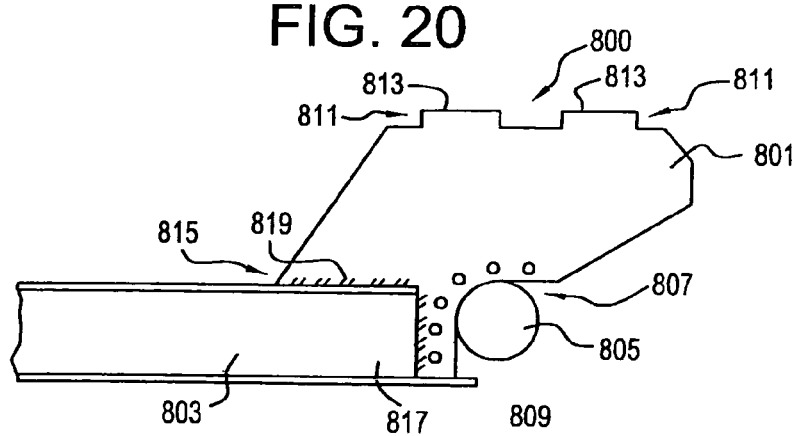
FIG. 20 is a side view schematic of an axle mounting arrangement for a trailer.

Referring now to FIG. 20, one embodiment of the axle mounting assembly is shown as reference numeral 800. The assembly comprises a pair of plates 801 (one shown). Each plate 801 is shaped to attach to a rail 803 and receive a rear axle 805 via a rigid or suspensionless mounting. In this embodiment, the assembly 800 is designed to be welded to the rails 803 for a permanent mounting, although a removable mount is also within the scope of the invention as described below.

The plate 801 is shaped with a recess 807 which can be customized or shaped to fit the axle of choice when the plate is made. Mounting openings 809 can be formed in the plate 801 for a bolted attachment of the axle 805 to the plate 801. Of course, other rigid attachments could be employed for mounting the axle 805 to the plate, the use of pins, welding or the like.

Figure 21:
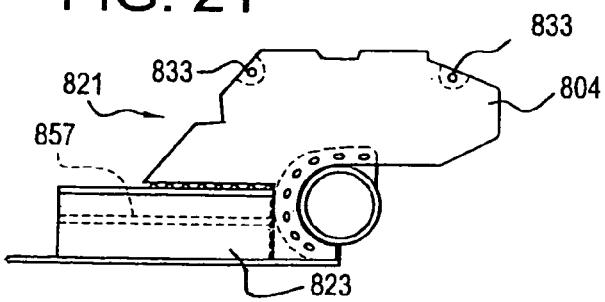
FIG. 21 is side view schematic of the axle mounting arrangement of FIG. 20 as part of a removable axle assembly.
Figure 22:
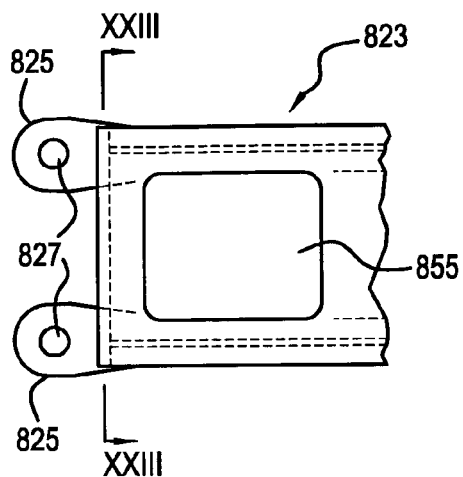
FIG. 22 is a top view of the base member of the arrangement of FIG. 21.
Figure 23:
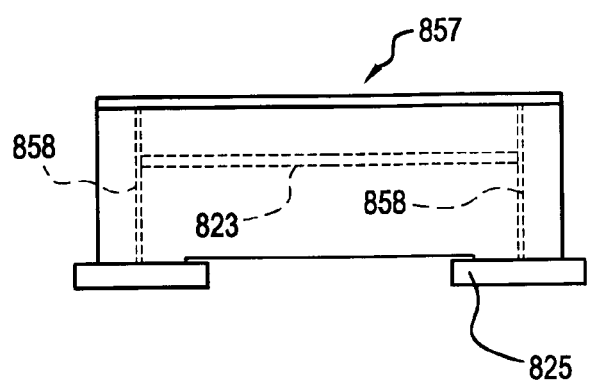
FIG. 23 is an end view along the line XXII-XXII of FIG. 22.

The plate can also be shaped to provide rest surfaces for equipment components and for attachment of fenders, if desired. In FIG. 21, the plate 801 is formed with a pair of castles 811 which have surfaces 813 rising above other surfaces of the plate. The surfaces 813 can act as rests for a bucket or the like during trailer use. If desired, one surface could be employed instead of a pair of surfaces. However, pairs of surfaces work well when using fenders as explained below.

Each plate 801 has another recess 815, which is shaped to interface with the end 817 of the straight rail 803, and welding 819 can be employed to link the plates and rails together. The plates are easily manufactured since the desired shape can be made by burning through a plate of larger dimension. This is a vast improvement in productivity and cost from bending the heavy duty rails as was done in the past. Another significant improvement is that the trailer mainbed and rails can be manufactured without the need to know the type and size of the axle to be used. Thus, a number of mainbeds and rails could be made, and then the plates 801 are sized once the axle type and size are known, for use with a standard lot of mainbeds and rails.

FIGS. 21-25 show the axle mounting assembly as part of a rear end removable assembly 821. Referring to FIG. 21, the assembly 821 includes plates 804 and a rear end base 823. Instead of attaching to the rail end 817 as shown in FIG. 20, the plate 804 attaches to the base 823, and the base 823 is removably mounted to the trailer end, similar to that shown in FIGS. 10 and 14-17. In the embodiment of FIGS. 21-25, the base has a pair of flanges 825 each of which having openings 827 to engage pins 829 in the rail ends 818. Of course, other ways can be employed to allow the base 825 to be removably attached to the rail ends 818.

Figure 24:
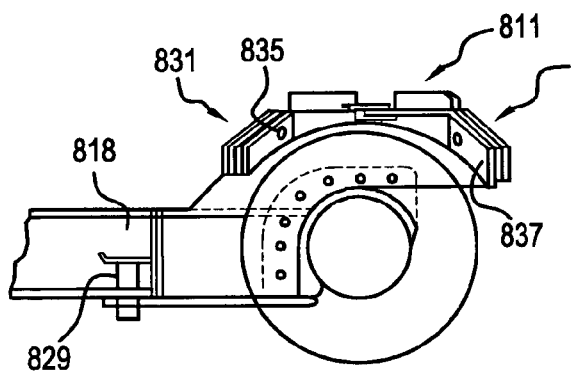
FIG. 24 shows the axle mounting arrangement of FIG. 23 mounted to a trailer and including fenders.
Figure 25:
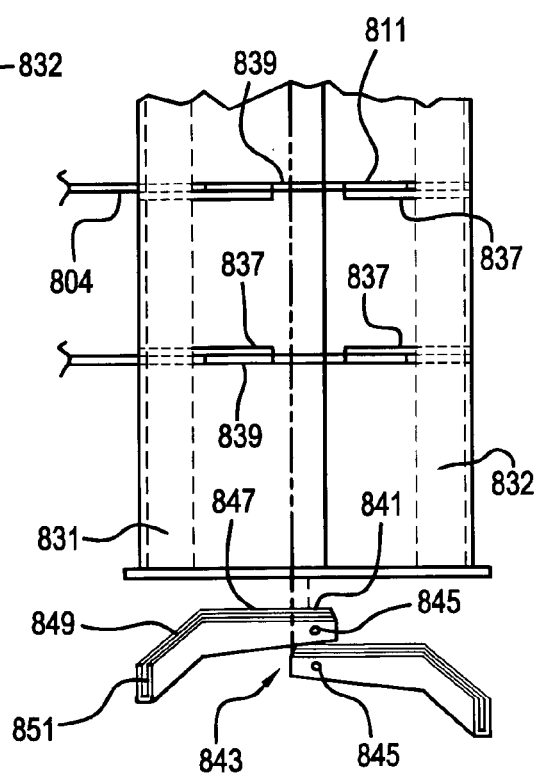
FIG. 25 shows a top and side view of fenders mounted to the axle mounting arrangement of FIG. 24.

In FIGS. 24 and 25, a pair of fenders 831 and 832 are shown. The fenders are configured to attach to the plates 804 via the mounting openings 833 in the plates (see FIG. 22), and corresponding openings 835 found in flanges 837 located along an underside of the fenders. The fenders also have openings 839, which are positioned so that the castles 811 extend therethrough and act as rests. The flanges 837 are located on the underside so that they are adjacent the plates 804 so that the fenders can be bolted to the plates 804. The fenders 831, 832 are configured to overlap as shown in FIG. 25 wherein one end 841 rests atop the end 843. Each of the ends 841 and 843 includes an opening 845 which allows the fenders 831 and 832 to be linked together with a fastener such as a bolt or the like.

The fenders 831 and 832 are preferably formed to have three segments, a generally horizontal segment 847, an angled segment 849, and a generally vertical segment 851. This shape gives the fender strength in the lateral direction of the trailer so that it can cantilever from the attachment point at the plates 804 towards and over the tires, thus eliminating the need for any other supports other than the plates 804.

Referring back to FIGS. 21-23, the base 823 can also include a box formed by an opening 855 in the base top, a box floor plate 857, and webs 858 forming the sides of the base 823. This box can be used to store chains, or other items that may be used in conjunction with the trailer.

It should be understood that other attachment schemes could be employed for securing the fenders to the plates 804, and that the fenders are optional if the particular application did not need them. Likewise, the castles are optional if the trailer would not be intended for use where a resting place at the trailer rear would be needed.

Another advantage to the axle mounting embodiment of the invention is ease of transportation. As with the removable axle assembly of FIG. 10, the components of the axle mounting embodiment are dimensioned to easily fit within the dimensional maximums of 7.5 feet by 38 feet as is used standard containers for transporting items. For example, by using two fenders, each fender is dimensioned for easy transport, whereas a single fender would not meet the narrow dimension limitation of 7.5 feet.

As such, an invention has been disclosed in terms of preferred embodiments thereof which fulfills each and every one of the objects of the present invention as set forth above and provides a new and improved trailer, trailer front end assembly, and method of use and assembly.

Of course, various changes, modifications and alterations from the teachings of the present invention may be contemplated by those skilled in the art without departing from the intended spirit and scope thereof. It is intended that the present invention only be limited by the terms of the appended claims.

What is claimed is:

1. In a trailer having a front loading end, a trailer bed, and a rear wheeled end, the trailer having a number of longitudinally aligned trailer bed support rails, and a front end assembly, the front end assembly having a pick up shaft arrangement, a hitch contact area, and opposing ramp sections, the improvement comprising a tapered box beam extending from the pickup shaft arrangement, linking to a center portion of an end of the trailer bed, the center portion spaced from sides of the trailer bed, the tapered box beam including at least two tapered box beam rails, an end of each tapered box beam rail aligned with a respective one of the pair of the trailer bed support rails in the center portion, the box beam using the at least two tapered box beam rails as outer side walls thereof, the box beam having top and bottom portions, the top portion including the hitch contact area, the top and bottom portions terminating at the outer side walls that are spaced inward of the sides of the trailer bed, and a portion of the box beam situated between the hitch contact portion and the end of the trailer bed.

2. The trailer of claim 1, further comprising at least a pair of tapered side rails, the at least two tapered box beam rails disposed between the tapered side rails, and cross members interconnecting the side rails, successive heights of the cross members following the tapers of the side rails and the at least two tapered box beam rails.

3. The trailer of claim 1, wherein the tapered rails have webs and opposing flanges, and the flanges form part of the top and bottom portions of the box beam.

4. The trailer of claim 1, further comprising one of a multiple axle over-the road assembly and an off-road axle assembly are removably attached to an end of the trailer.

5. The trailer of claim 1, further comprising at least one adapter block mounted to the trailer for movement between a stored and an operating position, the block testing on a top surface portion of the trailer in the operating position, the block having a receiving surface for trailer lifting, and positioned underneath the top surface portion in the stored position.

6. The trailer of claim 5, further comprising a pair of adapter blocks, each adapter block separately pivotable between the stored and operating positions.

7. The trailer of claim 1, wherein the trailer support rails are straight at a rear end portion thereof, and further comprising a pair of rear axle mounting plates adapted to connect to respective rear ends of the trailer support rails in a vertical orientation, the rear axle mounting plates adapted to rigidly support a rear axle.

8. The trailer of claim 7, wherein the axle mounting plate is welded to the rear ends or removably attached thereto.

9. The trailer of claim 7, wherein the plates include surfaces for resting of one or more components being hauled on the trailer.

10. The trailer of claim 7, further comprising fenders mounted to and extending laterally across the rear axle mounting plates.

11. The trailer of claim 10, wherein portions of the plates containing the resting surfaces extend through openings in the fenders.

12. In a method of lifting a lowboy trailer having a trailer bed and using a gooseneck hitch, wherein a hook of the hitch couples to a pickup shaft, and a tow member of the hitch applies a lifting force to the trailer front end assembly to pivot the gooseneck and raise the trailer, the improvement comprising:

providing a tapered box beam with a portion that extends between an end of the trailer bed where trailer rails of the trailer bed terminate and a hitch contact of the front end assembly, top and bottom portions of the tapered box beam terminating at outer surface side walls, the outer surface side walls of the tapered box beam forming a width that is less than the width of the trailer bed; and lifting the trailer end using the gooseneck hitch whereby the tapered box beam distributes the lifting load along the box beam length and to a center portion of an end of the trailer bed that is spaced from the sides of the trailer bed.

13. The method of claim 12, wherein the tapered box beam includes tapered side rails connected together by cross members tapered in height to match a taper of the box beam, and the lifting step distributes load to at least a portion of the tapered sides rails via the cross members.

14. In a trailer having a front loading end and a rear wheeled end, the trailer having a number of longitudinally aligned trailer load support rails, and a front end assembly, the front end assembly having a pick up shaft arrangement, hitch contact area, and opposing ramp sections, the improvement comprising:

a central box beam including top and bottom portions, and at least two tapered box beam rails as walls of the box beam, the top and bottom portions terminating at the walls of the box beam that are spaced inward of the sides of the trailer bed, the central box beam extending from the pickup shaft arrangement to at least a trailer bed front portion, the at least two tapered box beam rails aligned with two center rails of the trailer load support rails that further extend a length of the trailer, a portion of the box beam extending between the trailer bed front portion and the hitch contact area;

a trailer bed assembly comprising a pair of trailer bed side sections and cross members, each trailer bed side section linked to the center support rails via the cross members; and the pair of ramp sections removably attachable to the trailer bed assembly at the trailer bed front portion, the box beam longitudinally disposed between the ramp sections.

15. The trailer of claim 14, wherein the cross members extend through the center support rails or extend laterally and outwardly from the center support rails.

16. The trailer of claim 15, wherein the side bed sections use link plates and pins or opening-containing flanges and pins to connect to the cross members.

17. The trailer of claim 14, further comprising at least one axle assembly attached to at least two of the trailer load support rails or a removable axle assembly attached to ends of the trailer load support rails.

18. The trailer of claim 14, wherein each side bed section includes a longitudinal rail between sides thereof, the longitudinal rail positioned to absorb crash down forces during trailer loading.

19. The trailer of claim 18, wherein the side bed sections have outer side rails which are lighter in duty than the longitudinal rail.

20. The trailer of claim 18, further comprising a rear removable axle assembly attached to ends of the center support rails, and wherein the rear removable axle assembly is a single assembly for off-road use or a dual assembly for over-the-road use, one of the dual assemblies attached to ends of the center support rails.

21. A method of constructing a front end loading trailer comprising:

providing a central box beam including top and bottom portions, and at least two tapered support rails that form side walls of the box beam, the top and bottom portions terminating at the side walls and being spaced inward of the sides of the trailer bed, the central box beam extending from a pickup shaft arrangement to at least a trailer bed front portion, a portion of the central box beam lying between the trailer bed front portion and a hitch contact area of the trailer, the at least two tapered support rails aligned with center support rails that extend a length of the trailer;

providing trailer bed side sections, and attaching the trailer bed side section to cross members linked to the center support rails in a removable manner; and attaching a ramp section to either or both of the central box beam or the trailer assembly, with the box beam disposed longitudinally between the ramp sections.

22. The method of claim 21, wherein the cross members extend through the center support rails, or extend laterally and outwardly from the center support rails.

23. The method of claim 21, further comprising the step of providing a removable axle assembly attached to ends of the center support rails.

24. The method of claim 23, wherein the removable axle assembly is a single off-road use axle assembly or a dual over-the-road use axle assembly, one of the single off-road use axle assembly or a dual over-the-road use axle assembly attached to ends of the center support rails.

25. The method of claim 24, wherein, prior to attaching the trailer bed side sections to the center rails, the method further comprises the steps of;

a) configuring the trailer with the center box beam and center rails with a width to allow over-the road travel and thus forming an over-the road trailer;

b) attaching the dual over-the-road use axle assembly to the over-the road trailer;

c) driving the over-the road trailer to a site so that the trailer bed side sections and single off-road use assembly can be attached to the over-the road trailer to make it an off-road trailer.

26. The method of claim 25, wherein one or both of the single off-road use axle assembly and trailer bed side sections are loaded onto the over-the-road trailer prior to the driving step.

* * * * *